United States Patent
Lee

(10) Patent No.: US 8,340,865 B2
(45) Date of Patent: Dec. 25, 2012

(54) APPARATUS AND METHOD OF CONTROLLING VEHICLE WHEEL SPIN

(75) Inventor: Hyungsoo Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 1048 days.

(21) Appl. No.: 11/966,403

(22) Filed: Dec. 28, 2007

(65) Prior Publication Data

US 2009/0132123 A1 May 21, 2009

(30) Foreign Application Priority Data

Nov. 15, 2007 (KR) .................. 10-2007-0116638

(51) Int. Cl.
*B60K 28/16* (2006.01)
(52) U.S. Cl. .......... 701/41; 180/197; 123/319; 123/325; 123/332; 123/334; 123/335; 123/349; 701/36; 701/54; 701/70; 701/71; 701/72; 701/73; 701/79; 701/81; 701/82; 701/84; 701/86
(58) Field of Classification Search ............ 303/122.06, 303/138; 180/197, 281–286; 123/406.11–406.12, 123/406.23–406.25, 406.46, 406.47, 406.5–406.54; 701/1, 29, 36–48, 51–91
See application file for complete search history.

(56) References Cited

U.S. PATENT DOCUMENTS

| | | | | |
|---|---|---|---|---|
| 4,545,240 A * | 10/1985 | Leiber | .............. | 73/146 |
| 4,809,183 A * | 2/1989 | Eckert | .............. | 701/93 |
| 5,099,942 A * | 3/1992 | Kushi et al. | .............. | 180/197 |
| 5,213,178 A * | 5/1993 | Polidan et al. | .............. | 180/197 |
| 5,265,693 A * | 11/1993 | Rees et al. | .............. | 180/197 |
| 5,291,965 A * | 3/1994 | Takata | .............. | 180/197 |
| 5,431,242 A * | 7/1995 | Iwata et al. | .............. | 180/197 |
| 5,548,513 A * | 8/1996 | Masuda et al. | .............. | 701/90 |
| 5,559,703 A * | 9/1996 | Iwata et al. | .............. | 701/86 |
| 5,765,657 A * | 6/1998 | Fukumura et al. | .............. | 180/197 |
| 5,803,197 A * | 9/1998 | Hara et al. | .............. | 180/248 |
| 5,884,719 A * | 3/1999 | Schramm et al. | .............. | 180/197 |
| 5,895,434 A * | 4/1999 | Fennel et al. | .............. | 701/48 |
| 5,931,884 A * | 8/1999 | Ochiai | .............. | 701/51 |
| 6,105,703 A * | 8/2000 | Kuroda et al. | .............. | 180/248 |
| 6,128,568 A * | 10/2000 | Sasaki | .............. | 701/86 |
| 6,161,641 A * | 12/2000 | Fukumura et al. | .............. | 180/197 |
| 6,339,739 B1 * | 1/2002 | Folke et al. | .............. | 701/70 |

(Continued)

FOREIGN PATENT DOCUMENTS

JP 7-259593 A 10/1995

(Continued)

*Primary Examiner* — Jonthan M Dager
(74) *Attorney, Agent, or Firm* — Morgan, Lewis & Bockius LLP

(57) ABSTRACT

The present invention provides a vehicle wheel spin control apparatus that, when it is determined that a wheel spin occurs, reduces engine torque to prevent the wheel spin, including: detecting driving control information and information on the state of a vehicle and determining whether basic conditions required to perform engine torque limit control to prevent the wheel spin are satisfied; when the basic conditions are satisfied, calculating a speed variation and the speed gradient value, and comparing the speed gradient value with a predetermined speed gradient value to determine whether a spin occurs; when it is determined that the spin occurs, using a torque gradient map set according to the current engine torque to perform the engine torque limit control; and when the vehicle speed is reduced by the engine torque limit control and cancellation conditions are satisfied, canceling the engine torque limit control and returning to normal control.

7 Claims, 3 Drawing Sheets

U.S. PATENT DOCUMENTS

| | | | |
|---|---|---|---|
| 6,439,675 B1* | 8/2002 | Zechmann et al. | 303/191 |
| 6,564,136 B2* | 5/2003 | Asumi et al. | 701/70 |
| 6,701,243 B1* | 3/2004 | Roll et al. | 701/83 |
| 7,074,160 B1* | 7/2006 | Inoue et al. | 477/180 |
| 7,274,985 B2* | 9/2007 | Nagaya et al. | 701/82 |
| 7,330,785 B2* | 2/2008 | Odenthal et al. | 701/70 |
| 7,421,327 B2* | 9/2008 | Romer et al. | 701/69 |
| 7,509,194 B2* | 3/2009 | Wheals et al. | 701/36 |
| 7,680,571 B2* | 3/2010 | Fayyad et al. | 701/33.9 |
| 7,681,960 B2* | 3/2010 | Wanke et al. | 303/146 |
| 7,826,970 B2* | 11/2010 | Kobayashi et al. | 701/300 |
| 2003/0040849 A1* | 2/2003 | Hathout et al. | 701/1 |
| 2003/0209377 A1* | 11/2003 | Sauter | 180/197 |
| 2006/0036361 A1* | 2/2006 | Romer et al. | 701/84 |
| 2006/0195231 A1* | 8/2006 | Diebold et al. | 701/1 |
| 2006/0273657 A1* | 12/2006 | Wanke et al. | 303/146 |
| 2007/0185638 A1* | 8/2007 | Odenthal et al. | 701/70 |
| 2007/0299592 A1* | 12/2007 | Romer et al. | 701/69 |
| 2008/0183353 A1* | 7/2008 | Post et al. | 701/42 |
| 2009/0024263 A1* | 1/2009 | Simon et al. | 701/22 |
| 2010/0025131 A1* | 2/2010 | Gloceri et al. | 180/65.28 |

FOREIGN PATENT DOCUMENTS

| | | |
|---|---|---|
| KR | 2000-0056286 A | 9/2000 |
| KR | 2001-0045751 A | 5/2001 |

\* cited by examiner

APPARATUS AND METHOD OF CONTROLLING VEHICLE WHEEL SPIN

CROSS-REFERENCE TO RELATED APPLICATION

This application, claims priority to and the benefit of Korean Patent Application No. 10-2007-0116638, filed in the Korean Intellectual Property Office on Nov. 15, 2007, the entire contents of which are incorporated herein by reference.

BACKGROUND OF THE INVENTION (a) Field of the Invention

The present invention relates to a vehicle dynamic control system, and more particularly, to an apparatus and method of controlling a vehicle wheel spin that, when a wheel spin occurs in a vehicle, reduces engine torque to prevent the wheel spin.

(b) Description of the Related Art

Various attitude control apparatuses, such as ESP and ESC, have been provided in vehicles. The attitude control apparatus detects and analyzes a yaw moment of the vehicle traveling. When the condition of spin or under steer is satisfied, the attitude control apparatus applies a braking force to an inner wheel or an outer wheel, or each wheel in operative association with a TCS (traction control system) and an ABS (antilock brake system) to control the attitude of the vehicle.

The vehicle attitude control apparatuses have been mounted to luxury cars because they are expensive.

Therefore, when an excessive wheel spin occurs in the vehicle without the attitude control apparatus, such as ESP or ESC or with the attitude control apparatus that is out of order, there is no way to solve the problem of the wheel spin, and drivability deteriorates, which may come to a traffic accident.

In addition, when the right and left wheels are driven under different road conditions, an excessively large difference in speed between the left wheel and the right wheel occurs. When this driving condition is maintained, a differential apparatus of a transmission is damaged.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a technique for performing engine torque limit control to reduce a wheel spin and ensuring drivability when an excessive wheel spin occurs in a vehicle without an attitude control apparatus or with an attitude control apparatus that is out of order during the driving of the vehicle.

In addition, another object of the invention is to provide a technique for performing engine torque limit control to protect a differential apparatus of a transmission when left and right wheels are driven under different road conditions and an excessively large difference in speed between the left and right wheels occurs.

An exemplary embodiment of the present invention provides a vehicle wheel spin control apparatus. The apparatus includes: a vehicle speed detecting unit that detects a vehicle speed; an accelerator pedal detecting unit that detects the displacement of an accelerator pedal: a control unit that, when driving information indicates that a wheel spin occurs and predetermined operation conditions are satisfied, performs engine torque limit control, and when cancellation conditions set according to the engine torque limit control are satisfied, returns to normal control; an injection device that cuts the supply of fuel to combustion chambers or reduces the amount of fuel injected to the combustion chambers according to the engine torque limit control performed by the control unit; and an ignition device that delays ignition timing according to the engine torque limit control performed by the control unit.

Another exemplary embodiment of the present invention provides a method of controlling a vehicle wheel spin. The method includes: detecting driving control information and information on the state of a vehicle and determining whether basic conditions required to perform engine torque limit control to prevent the wheel spin are satisfied; when the basic conditions are satisfied, calculating a speed variation and the speed gradient value of the speed variation, and comparing the speed gradient value with a predetermined gradient value to determine whether a spin occurs; when it is determined that the spin occurs, using a torque gradient map set according to the current engine torque to perform the engine torque limit control; and when the vehicle speed is reduced by the engine torque limit control and cancellation conditions are satisfied, canceling the engine torque limit control and returning to normal control.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DESCRIPTION OF REFERENCE NUMERALS INDICATING PRIMARY ELEMENTS IN THE DRAWINGS

| | |
|---|---|
| 110: vehicle speed detecting unit | 120: accelerator pedal detecting unit |
| 130: ABS | 140: control unit |
| 150: injection device | 160: ignition device |

It should be understood that the appended drawings are not necessarily to scale, presenting a somewhat simplified representation of various preferred features illustrative of the basic principles of the invention. The specific design features of the present invention as disclosed herein, including, for example,

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
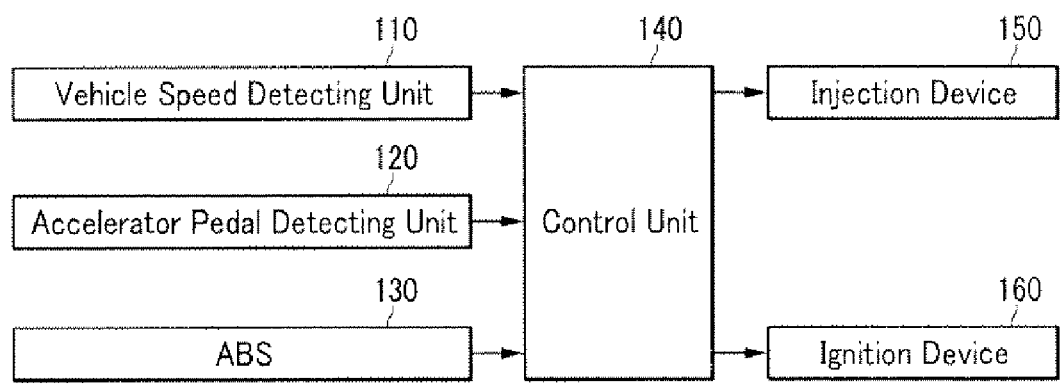
FIG. 1 is a diagram schematically illustrating a vehicle wheel spin control apparatus according to an exemplary embodiment of the present invention.

FIG. 1 is a diagram schematically illustrating the structure of a vehicle wheel spin control apparatus according to an exemplary embodiment of the present invention.

As shown in FIG. 1, the vehicle wheel spin control apparatus according to this exemplary embodiment of the present invention includes a vehicle speed detecting unit 110, an accelerator pedal detecting unit 120, an ABS 130, a control unit 140, an injection device 150, and an ignition device 160.

The vehicle speed detecting unit 110 is a vehicle speed sensor provided in each wheel or a speed sensor connected to an output shaft of a transmission. The vehicle speed detecting unit 110 detects the speed of a vehicle traveling and provides information on the speed of the vehicle to the control unit 140.

The accelerator pedal detecting unit 120 detects the displacement of an accelerator pedal (not shown) for accelerating or decelerating the vehicle and provides information on the displacement of the accelerator pedal to the control unit 140.

The ABS 130 controls the braking force of each wheel according to the rotational speed of each wheel during a brake control operation to prevent the wheels from being locked under any conditions. The ABS 130 provides to the control unit 140 information on a current operating status of the ABS 130, i.e., whether the ABS 130 is applied to the wheel or not.

As a result the above-mentioned information, i.e., the speed of the vehicle, the displacement of the accelerator pedal, and the current operating status of the ABS 130, comprises the driving control information of the vehicle.

From this driving control information of the vehicle, the control unit 140 determines whether the excessive wheel spin occurs during driving as explained hereinafter.

When driving information indicating that an excessive wheel spin occurs during driving is detected and control conditions are satisfied, the control unit 140 performs engine torque limit control to prevent the occurrence of the wheel spin.

The engine torque limit control is performed when the following conditions are all satisfied: ESP/ESC are out of order or not installed: a vehicle speed is equal to or lower than a predetermined reference speed (60 Km/h); the speed gradient value dNo of the vehicle speed is equal to or larger than a predetermined speed gradient value dNo1; the ABS is normally operated; and the displacement of the accelerator pedal is equal to or greater than a predetermined displacement value (20%).

In addition, the engine torque limit control is cancelled when any one of the following conditions is satisfied: the ESP/ESC are normally operated; the vehicle speed is equal to or higher than the predetermined reference speed (60 Km/h); the speed gradient valley dNo of the vehicle speed is equal to or smaller than a predetermined speed gradient value dNo2; the ABS is out or order; and the displacement of the accelerator pedal is equal to or smaller than a predetermined displacement value (5%).

While the engine torque limit control is performed, the injection device 150 injects a predetermined amount of fuel to each combustion chamber in response to a control signal from the control unit 140 to control engine torque. That is, when the engine torque limit control is performed, the injection device 150 reduces the amount of fuel injected to each combustion chamber or cuts the supply of fuel to each combustion chamber, thereby reducing engine torque.

Further, the ignition device 160 controls the ignition timing of a spark plug provided in each combustion chamber in response to the control signal from the control unit 140. When the engine torque limit control is performed, the ignition device 160 delays the ignition timing to reduce the output torque of the engine.

Figure 2:
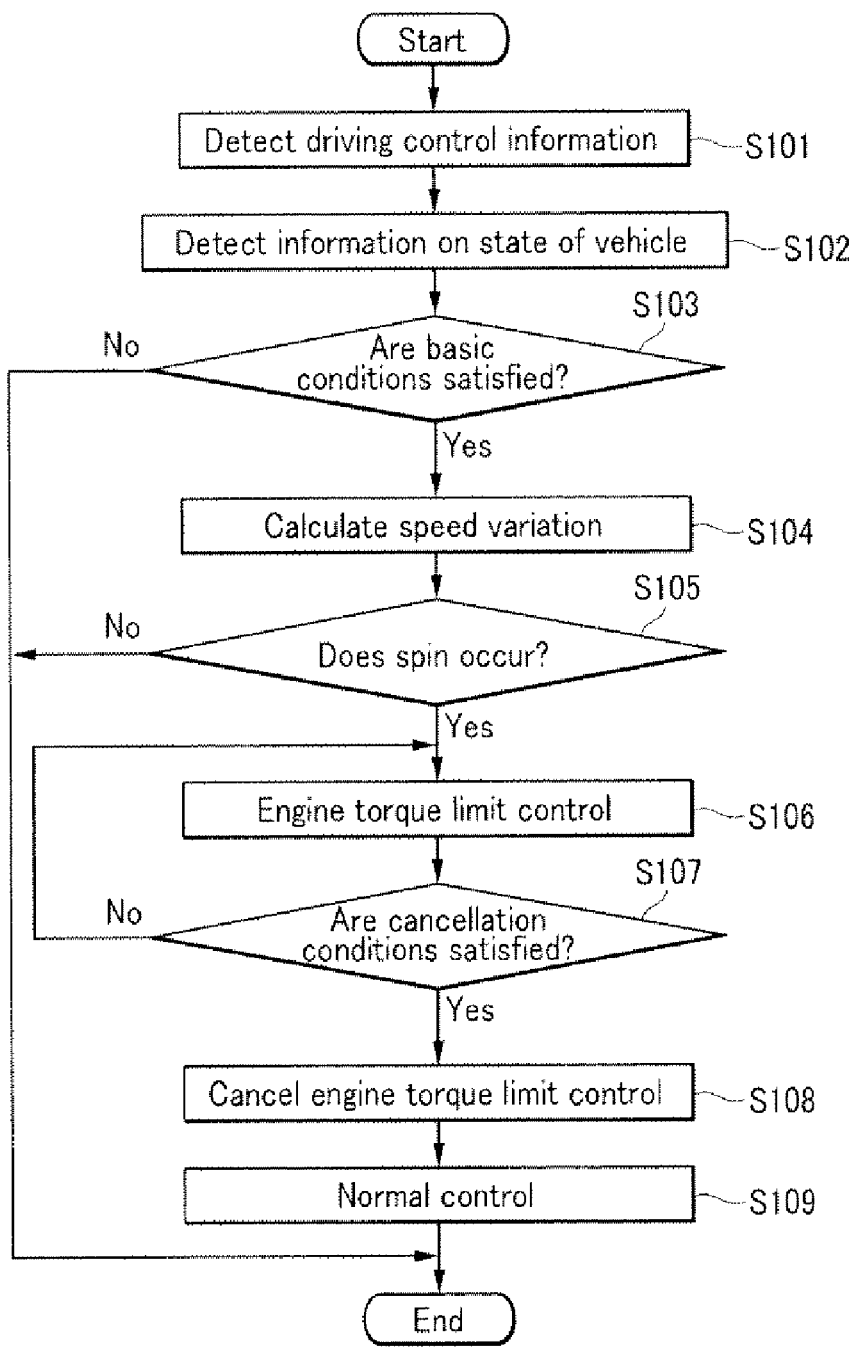
FIG. 2 is a flowchart illustrating a wheel spin control process performed in a vehicle according to an exemplary embodiment of the present invention.

Next, the operation of the vehicle wheel spin control apparatus having the above-mentioned structure performing the engine torque limit control when a wheel spin is detected will be described below in detail with reference to FIG. 2.

When the vehicle starts traveling, the control unit 140 controls the vehicle speed detecting unit 11 to detect the current speed of the vehicle and the accelerator pedal detecting unit 120 to detect the displacement of the accelerator pedal, and detects a current operating status of the ABS 130, thereby detecting driving control information (S101).

In addition, the control unit 140 detects vehicle state information including various apparatuses for driver convenience and safety apparatuses (S102).

Then, the control unit 140 determines whether the driving control information and the vehicle state information satisfy predetermined basic conditions (S103).

The predetermined basic conditions are satisfied when the current speed of the vehicle is equal to or lower than the predetermined reference speed (60 Km/h), the displacement of the accelerator pedal is equal to or larger than the predetermined displacement value (20%), ESP/ESC are not installed or are out of order, and the ABS 130 is normally operated.

When the driving control information, and the vehicle state information do not satisfy the basic conditions in Step S103, the control unit 140 ends the control process. When the driving control information and the vehicle state information satisfy the basic conditions, the control unit 140 calculates a variation in the speed per hour and extracts the speed gradient value dNo of the vehicle (S104).

In Step S104, the control unit 140 compares the calculated speed gradient value dNo of the speed variation with the predetermined speed gradient value dNo1 to determine whether a spin (slip) occurs (S105).

When it is determined in Step S105 that no spin occurs, the control unit 140 ends the control process. When it is determined that a spin occurs, the control unit starts an engine torque limit control by using a torque gradient map that is set as the following Table 1 to perform the engine torque limit control (S106) in an exemplary embodiment of the present invention.

In this case, the engine torque limit control signifies that the control unit 140 controls the injection device 150 to cut the supply of fuel to each combustion chamber or to reduce the amount of fuel injected to each combustion chamber, and controls the ignition device 160 to delay the ignition timing based on instruction of the control unit 140 in accordance with the following Table 1, thereby controlling the engine torque to prevent the wheel spin.

TABLE 1

| Engine Torque | | | | |
|---|---|---|---|---|
| | Engine torque(Nm) | | | |
| (Nm) | 50 | 150 | 300 | 400 |
| 10 | 45 | 140 | 260 | 340 |
| 20 | 43 | 130 | 240 | 310 |
| 30 | 40 | 120 | 220 | 290 |
| 40 | 35 | 110 | 200 | 270 |
| 50 | 32 | 100 | 180 | 250 |

However, the data of Table 1 are not limited thereto and any other data may employed and included as long as they carry out the function of controlling the engine torque, depending on the type of engine, and may be selected and programmed by a person of ordinary skill in the art based on the teachings herein.

In the process of using the map of Table 1 to perform the engine torque limit control, the control unit 140 determines whether predetermined cancellation conditions are satisfied (S107).

In the process of the engine torque limit control, the control unit 140 determines whether the predetermined cancellation conditions to terminate the process of the engine torque limit control are satisfied (S107).

The predetermined cancellation conditions are satisfied when any one of the following conditions are satisfied: ESP/ESC are normally operated; the vehicle speed is equal to or higher than a predetermined reference speed (60 Km/h); the speed gradient value dNo of the vehicle speed is equal to or smaller than a predetermined speed gradient value dNo2; the ABS 130 is out of order; and the displacement of the accelerator pedal is equal to or smaller than a predetermined displacement value (5%).

When it is determined in Step S107 that the cancellation conditions are satisfied, the control unit cancels the current engine torque limit control, and returns to normal control (S108 and S109).

That is, the control unit controls the injection device 150 to normally inject fuel whose amount is calculated under the engine conditions to each combustion chamber, and controls the ignition device 160 to normally set the ignition timing.

Figure 3:
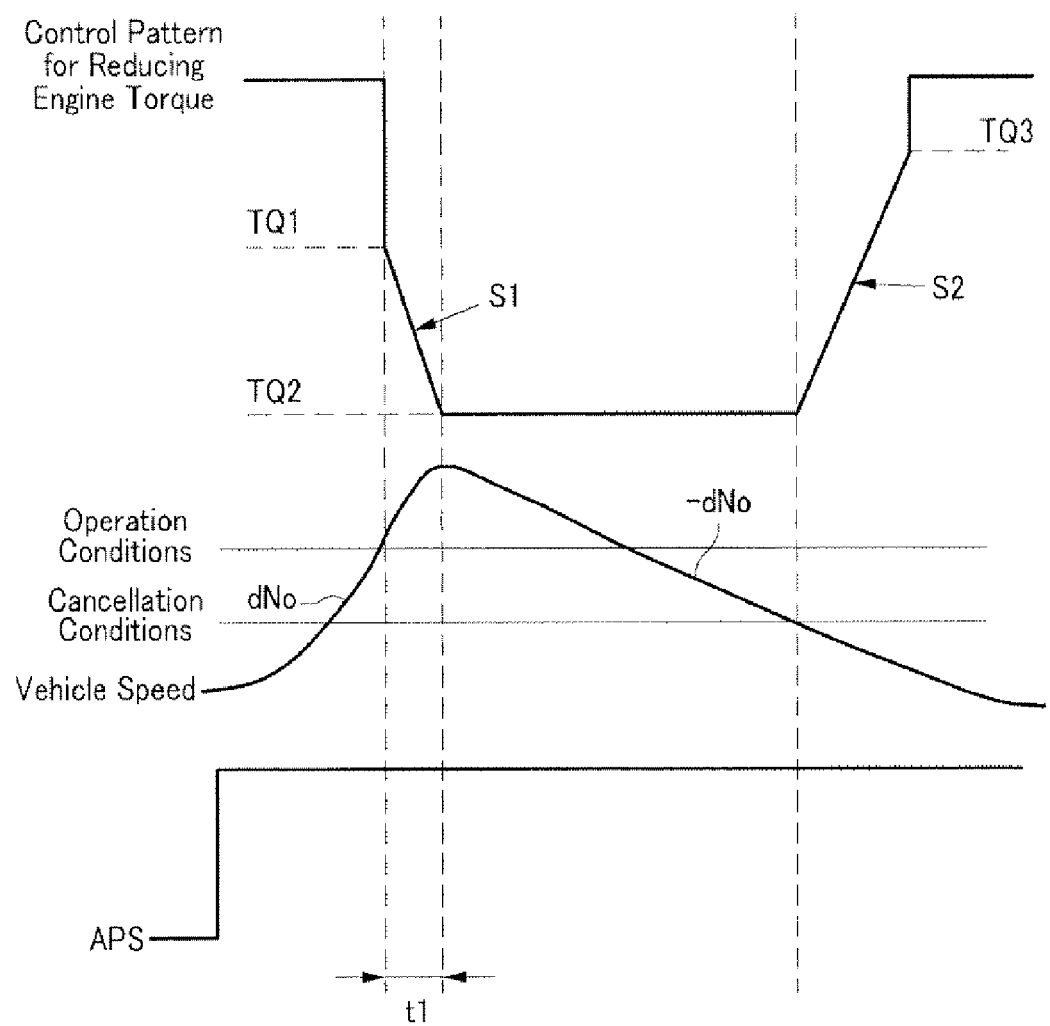
FIG. 3 is a diagram illustrating a control pattern for reducing engine torque in order to perform the wheel spin control in the vehicle according to an exemplary embodiment of the present invention.

FIG. 3 is a pattern diagram illustrating the concept of the engine torque limit control according to this exemplary embodiment of the present invention.

As shown in FIG. 3, the control unit uses the torque gradient map of Table 1 to perform the engine torque limit control with a value of "TQ1", when the all following conditions are satisfied: ESP/ESC are out of order or not installed; an ABS is normally operated; the displacement of the accelerator pedal is equal to or larger than a predetermined displacement value (20%); the vehicle speed is equal to or larger than a predetermined speed value (60 Km/h); and the speed gradient dNo of the vehicle is equal to or larger than a predetermined speed gradient value dNo1.

Then, the control unit initiates an engine torque limit control value, i.e., controls the injection device 150 to reduce or cut the supply of fuel injected to each combustion chamber and/or the ignition device to delay an ignition timing, and thus to have a torque gradient S1 according to the torque gradient map determined by Table 1.

During the engine torque limit control, when the vehicle speed is reduced after a predetermined time t1 has elapsed, the control unit fixes the engine torque limit control value to "TQ2" and maintains the fixed value. When the vehicle speed is reduced such that the absolute value of the speed gradient dNo of the vehicle speed is equal to or smaller than a predetermined speed gradient value dNo2 and the cancellation conditions are satisfied, the control unit cancels the engine torque limit control, and returns to normal control.

In this case, when the engine torque limit control is suddenly cancelled, a shock occurs. Therefore, the control unit uses the torque gradient map set in Table 1 to perform the cancellation control with a second torque gradient S2.

According to the above-described exemplary embodiment of the present invention, when a wheel spin between the left wheel and the right wheel occurs, the engine torque limit control is performed to prevent the wheel spin. Therefore, it is possible to ensure drivability and prevent the damage of a transmission output system.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A vehicle wheel spin control apparatus comprising:
a vehicle speed detecting unit that detects a vehicle speed;
an accelerator pedal detecting unit that detects a displacement of an accelerator pedal;
an engine torque control device; and
a control unit that is arranged to determine whether a predetermined operation and a predetermined cancellation condition are satisfied based on the vehicle speed, a speed gradient value, and the displacement of the accelerator pedal and whether wheel spin occurs;
wherein the control unit is arranged to perform an engine torque limit control with the engine torque control device when the predetermined operation condition is satisfied and wheel spin occurs;
wherein the engine torque limit control includes:
reducing an engine torque to a first torque value (TQ1);
reducing the engine torque to a second torque value (TQ2) with a first torque gradient (S1) according to a variation in the vehicle speed; and
maintaining the engine torque to the second torque value (TQ2) in a case that the vehicle speed is reduced after a predetermined time (t1) has elapsed from an inception of reducing the engine torque to the first value (TQ1).

2. The vehicle wheel spin control apparatus of claim 1, wherein the control unit cancels the engine torque limit control when the predetermined cancellation control is satisfied.

3. The vehicle wheel spin control apparatus of claim 1, wherein the control unit cancels the engine torque limit control by increasing engine torque from the second torque value (TQ2) to a third torque value (TQ3) with a second torque gradient (S2) according to the variation in the vehicle speed.

4. The vehicle wheel spin control apparatus of claim 1, wherein a torque gradient map for the engine torque limit control according to the variation in the vehicle speed is pre-set in the control unit.

5. The vehicle wheel spin control apparatus of claim 2, wherein the control unit controls the engine torque control device to the first torque gradient (S1) when the engine torque limit control is initiated.

6. The vehicle wheel spin control apparatus of claim 3, wherein the control unit controls the engine torque control device to the second torque gradient (S2) when the engine torque limit control is cancelled, thereby preventing an engine output shock.

7. The vehicle wheel spin control apparatus of claim 1, wherein the engine torque control device comprises:

an injection device that cuts the supply of fuel to combustion chambers or reduces the amount of fuel injected to the combustion chambers according to the engine torque limit control performed by the control unit; and an ignition device that delays ignition timing according to the engine torque limit control performed by the control unit.

* * * * *